United States Patent
Rogiers

[15] 3,653,175
[45] Apr. 4, 1972

[54] MACHINE FOR CONDITIONING PACKINGS

[72] Inventor: Etienne Marie Rogiers, Daknam, Lokeren, Belgium

[73] Assignee: Intercan S.A., Fribourg, Switzerland

[22] Filed: Jan. 14, 1970

[21] Appl. No.: 2,908

[30] Foreign Application Priority Data

Jan. 21, 1969 Belgium..................................69004

[52] U.S. Cl..................................................53/184, 53/30
[51] Int. Cl. ...................................B65b 47/02, B65b 47/08
[58] Field of Search.............................................53/30, 184

[56] References Cited

UNITED STATES PATENTS

| | | | |
|---|---|---|---|
| 3,464,182 | 9/1969 | Nichols | 53/184 |
| 3,522,687 | 8/1970 | Mahaffy | 53/184 X |

Primary Examiner—Theron E. Condon
Assistant Examiner—Eugene F. Desmond
Attorney—Prutzman, Hayes, Kalb & Chilton

[57] ABSTRACT

This invention relates to a machine for conditioning packings of foodstuffs and/or pharmaceutical products, comprising on the same fixed frame and mounted in series, a roller for supporting a thermoplastics film, a mechanism for guiding and conveying the edges of the thermoplastics film, said mechanism comprising a series of clips mounted on endless chains extending along the whole of the machine, a station for heating the thermoplastics film, a station for forming containers from the thermoplastics film, a filling station for loading the containers with the material to be packed, a welding station for closing a covering sheet over the filled containers and a station for cutting out the filled and closed containers, wherein each clip of the mechanism for guiding and conveying the thermoplastics film is constituted by a stop which is fixed with respect to its conveyor chain, the upper face of which stop is located substantially in the same plane as the lower face of the thermoplastics film and by a stop which is movable with respect to the fixed stop and urged by a spring against this latter and wherein at least one endless support chain is placed below the path of the thermoplastics film in a zone thereof located upstream of the station for forming the containers, the endless chains of the guide and conveyor mechanism and the support chain being connected to a step by step synchronism drive mechanism, the advance speed of which is sinusoidal; the heating plate of the heating station comprises resistors in the form of metal strips parallel to the thermoplastics film and perpendicular to the direction of displacement of this latter, and is articulated at its downstream end to a horizontal shaft and cooperates with a lifting member, said heating plate having rapid thermal response; the forming station comprises a vertically movable unit supporting a hollow mould and a vertically movable support arranged above the movable unit and provided with a pre-forming piston passing through a central bore open at its ends and made in a vertically movable locking plate of such dimensions that it defines with the wall of this bore, whatever the position of said piston between its end positions, a small space that may be obturated by the movable support and connected to a source of pressurized fluid at the end of the pre-forming stroke of the piston by means of a contact controlled by the movable support; a support roller for the covering sheet is arranged downstream of the filling station; and the welding tools and the cutting out tools are combined in one station only and may effect simultaneously the welding of the covering sheet on the containers filled with the material to be packed and the cutting out, at least partial, of the closed containers, said tools being arranged so that the welding of the covering sheet is carried out inside the zone where the containers are cut out.

10 Claims, 11 Drawing Figures

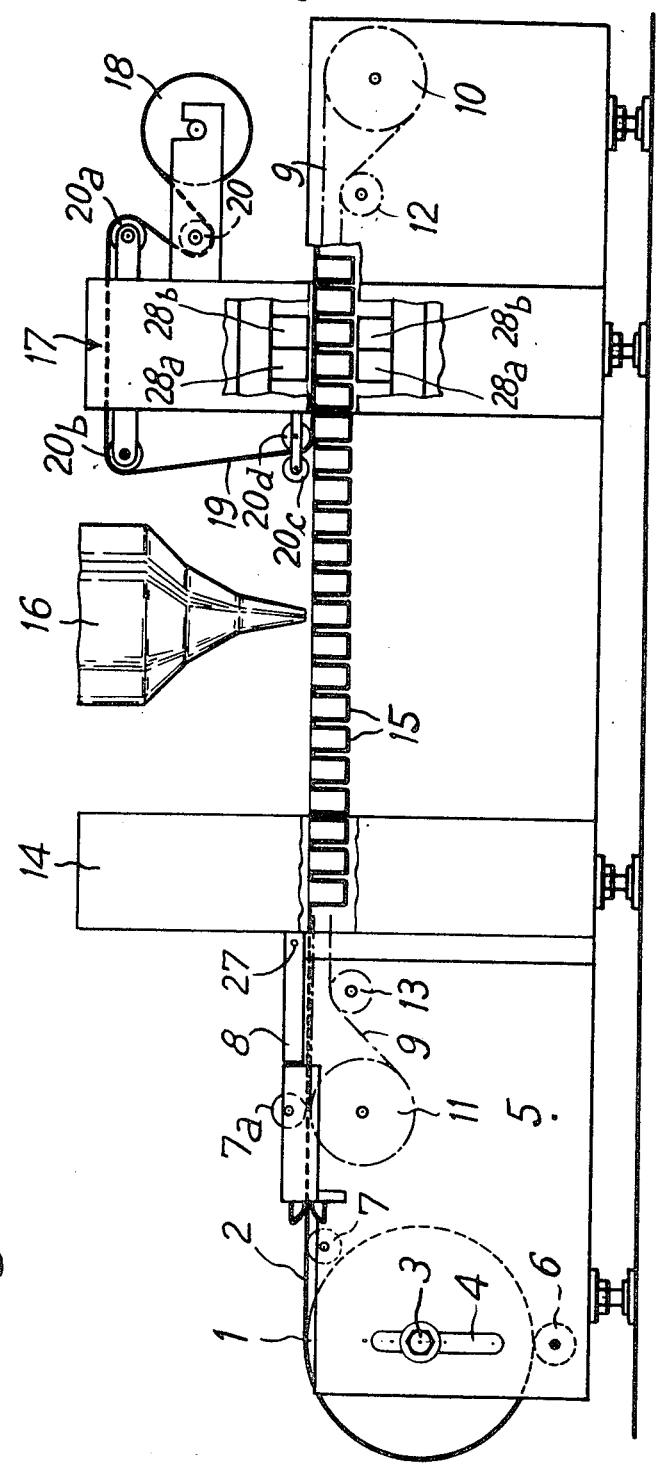

INVENTOR.
ETIENNE M. ROGIERS

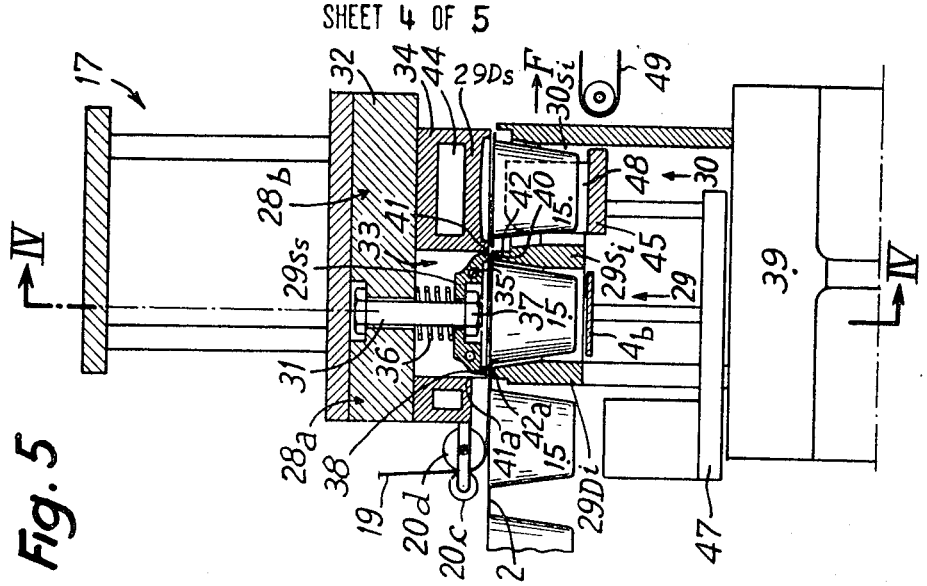
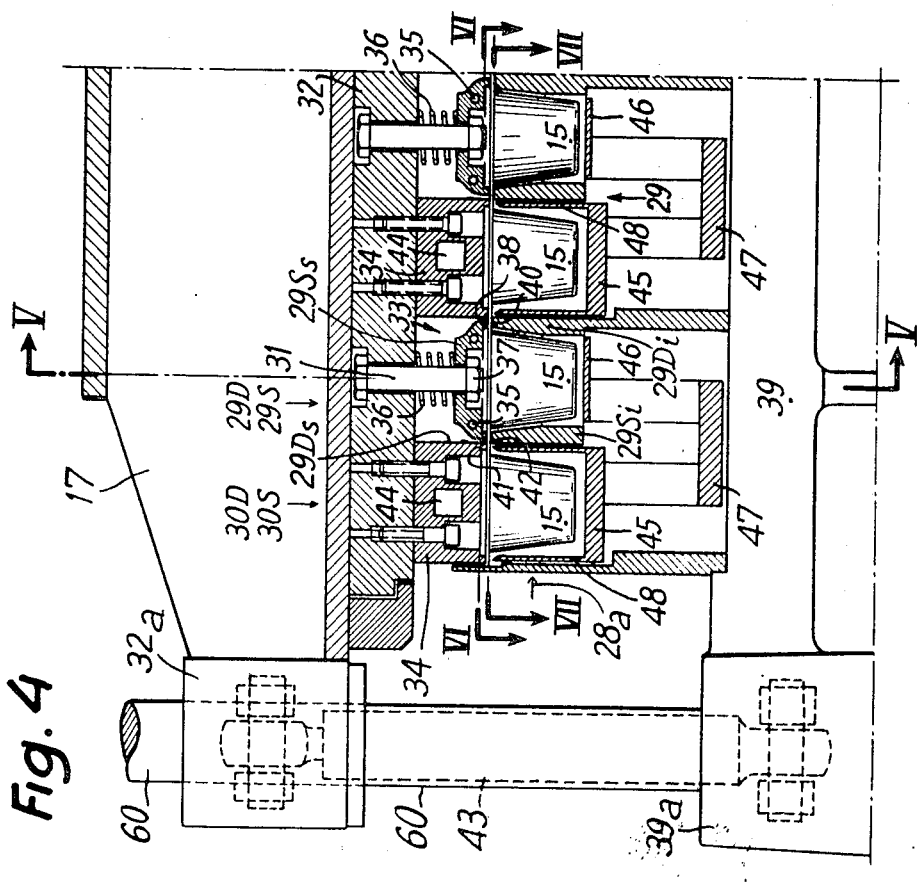

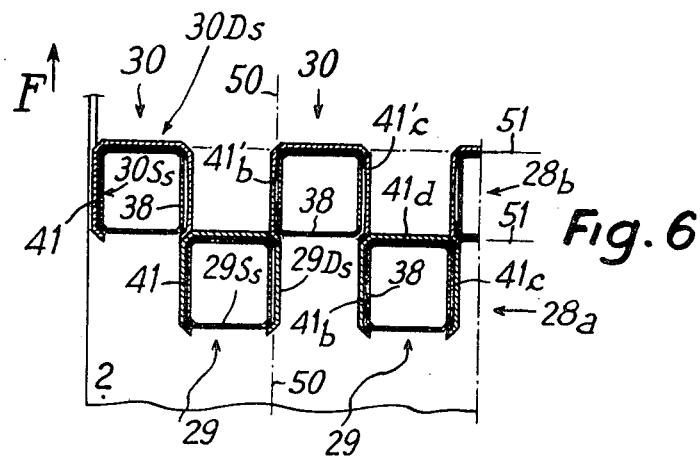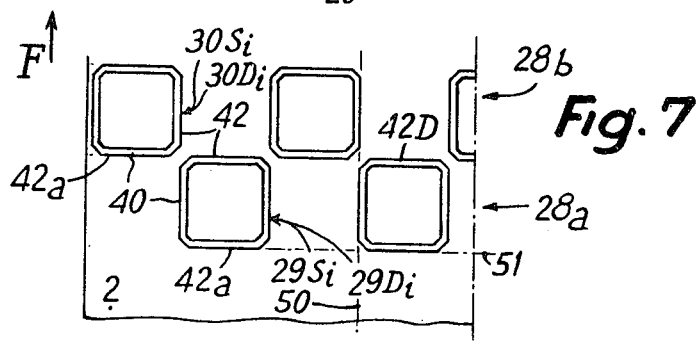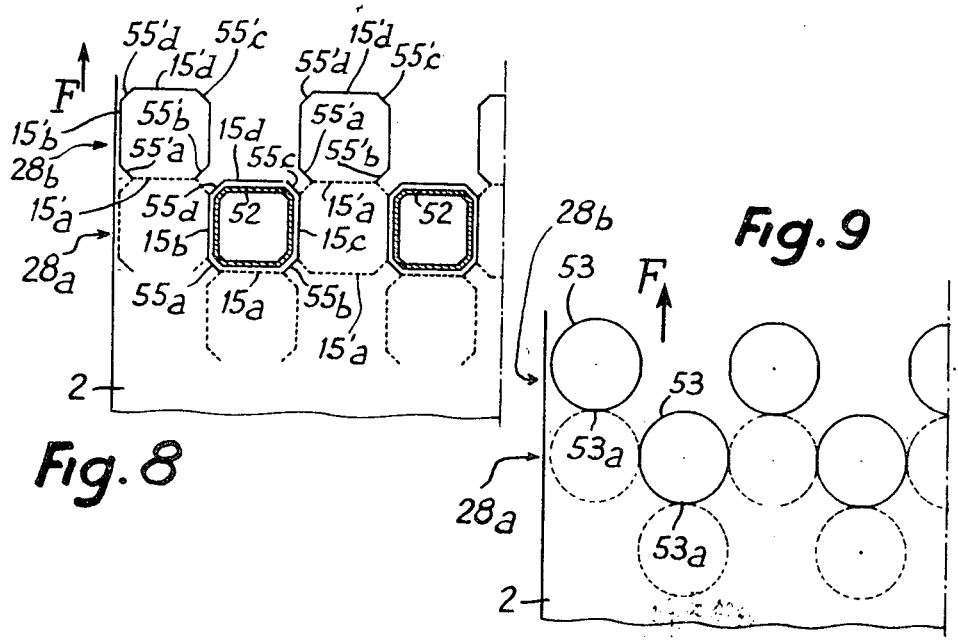

MACHINE FOR CONDITIONING PACKINGS

The present invention relates to a machine for conditioning packings constituted by containers made of plastics material and covered with a covering sheet.

More particularly, the invention relates to a machine conditioning the packings of foodstuffs or pharmaceutical products, comprising on the same fixed frame and mounted in series, a roller for supporting a thermoplastics film, a mechanism for guiding and conveying the edges of the thermoplastics film, said mechanism comprising a series of clips mounted on endless chains extending along the machine, a station for heating the thermoplastics film, a station for forming containers from the thermoplastics film, a filling station for loading the containers with the material to be packed, a welding station for closing a covering sheet over the filled containers and a station for cutting out the filled and closed containers.

A number of more or less automatic machines are known for conditioning packings. They are constituted by a forming station which, by means of a compressed air or vacuum piston acting on a thermoplastics film which was previously heated at the heating station and drawn by a support roller, makes the containers intended for receiving the product to be packed. These containers then reach the filling station, then the closure station at which a flat or shaped covering sheet is applied over the open face of the container; the containers thus closed are conducted to a cutting station which cuts the filled and closed containers either separately or in groups. Whatever the type of machine, there are always at least five stations.

One of the principal drawbacks consists in the guiding of the thermoplastics film during the whole passage of the thermoplastics film in the machine. For the guide, the edges of the thermoplastics film are held in clips mounted on endless conveyor chains traversing the whole of the machine. In order to ensure a good prehension of the thermoplastics film, the edges of said latter are curved upwardly or downwardly between the clips. Consequently, about 1 cm. of the thermoplastics film is gripped on each side, hence a substantial loss of irrecoverable material. In addition, when thick thermoplastics films are used, they break frequently if they are bent between the clips, so that the guiding is irregular and inefficient.

Regarding the heating station, the known machines comprise a heating plate provided with direct radiation resistors or resistors embedded in a ceramic material. As the filiform constituent elements of the resistors and/or the ceramic material are fairly fragile, they deteriorate very rapidly and do not allow a uniform heating.

In addition, the response time, i.e. the rise and fall of temperature of the resistors embedded in a ceramic material, is very long. It follows that, when the production of the containers is begun or stopped, there is always an extensive zone of the thermoplastics film which is too little or too much heated so that certain parts of the thermoplastics film become unsuitable for the production of the containers. In addition, by reason of the heterogeneity of the heating, the thermoplastics film undergoes non-uniform stresses when it is being conveyed.

The forming station, in its present design, has the disadvantage that the piston is covered by a bell-shaped member serving as a locking plate, the internal volume of which is fairly large when the pre-forming piston is near the base of the mould, and that the fluid necessary for forming the preformed containers also penetrates into the bell-shaped member. This mode of forming necessitates a considerable quantity or pressurized fluid and does not enable containers with relatively thin walls to be manufactured.

Finally, the known machines, the welding of the covering sheet over the open face of the containers filled with the material to be packed, and the cutting out of the containers thus closed, are effected in two separate operations, this frequently resulting in a shift of the covering sheet with respect to the openings of the containers. After a defective cutting out of the containers, these latter then present covering sheets whose patterns are cut in the wrong places, so that the appearance thereof is spoiled. In order to correct this shift, one is then obliged to stretch the covering sheet to an exaggerated degree. Since this tension is maintained for as long as the containers form an integral part with the thermoplastics film, i.e. until the containers are cut out, the covering sheet is striated and/or the containers become deformed under the influence of this tension.

In addition, the known packing machines have a mechanism for driving the thermoplastics film fairly slowly in order to avoid the material contained in the containers from passing above the edge of said containers. This slow drive prevents an increase in the productivity of the machines, because if the jerky advance motion becomes too rapid, the material contained in the containers passes above the edge thereof and then prevents them from being closed by the covering sheet.

The designers are therefore obliged to construct very complex, cumbersome conditioning machines of high cost price, but still without enabling the user to avoid the losses of raw material and time nor to produce a packing which is suitable from all points of view.

The present invention obviates the above-mentioned drawbacks and to this end proposes an entirely automatic machine enabling packings such as containers for foodstuffs or pharmaceutical products to be produced, the design of which containers are without any defect.

To this end, the machine of the type mentioned hereinabove is characterized, according to the invention, in that each clip of the mechanism for guiding and conveying the thermoplastics film is constituted by a stop fixed with respect to its conveyor chain, the upper face of which stop is located substantially in the same plane as the lower face of the thermoplastics film and by a stop which is movable with respect to the fixed stop and urged by a spring against this latter and in that at least one endless support chain is placed below the path of the thermoplastics film in a zone thereof located upstream of the station for forming the containers, the endless chains of the guide and conveying mechanism and the support chain being connected to a step by step synchronism drive mechanism, the advance speed of which is sinusoidal; the heating plate of the heating station comprises resistors in the form of metal strips parallel to the thermoplastics film and perpendicular to the direction of displacement of this latter, and is articulated at its downstream end to a horizontal shaft and cooperates with a lifting member, said heating plate having rapid thermal response; the forming station comprises a vertically movable unit supporting a hollow mould and a vertically movable support arranged above the movable unit and provided with a pre-forming piston passing through a central bore open at its ends and made in a vertically movable locking plate of such dimensions that it defines with the wall of this bore, whatever the position of said piston between its end positions, a small space that may be obturated by the movable support and connected to a source of pressurized fluid at the end of the pre-forming stroke of the piston by means of a contact controlled by the movable support; a support roller for the covering sheet is arranged downstream of the filling station; and the welding tools and cutting out tools are combined in one station only and may effect simultaneously the welding of the covering sheet on the containers filled with the material to be packed and the cutting out, at least partial, of the closed containers, said tools being arranged so that the welding of the covering sheet is carried out inside the zone where the containers are cut out.

Due the present invention, the machine has no more than four separate working stations, instead of five.

Another advantage resides in the exact guiding and advance of the thermoplastics film which, supported upstream of the forming station by the support chain or chains, no longer dips, so that there is no internal tension in the thermoplastics film. In addition, as the thick thermoplastics film is not folded on its edges, there is no fracture which may cause a poor guiding and/or advance motion of said film.

The new heating station enables the thermoplastics film to be taken very quickly to the temperature necessary for forming the containers and to operate at a suitable temperature which is distributed uniformly without risk of burning for the thermoplastics film. In addition, when the machine stops, the fact of having provided flat bare resistors, on the one hand enables the film to be very rapidly cooled, which avoids a local overheating of the said film, and on the other hand permits a very swift restarting of the machine after it has stopped, because the heating resistors are very quickly taken to the sufficient temperature. Finally, due to the articulation of the heating plate near the forming station, it is possible to create in the stopped film, by lifting the heating plate, a linear temperature gradient, the temperature of the film increasing progressively from the upstream end to the downstream end of said plate.

This mode of heating according to the invention presents practically no thermal inertia and is therefore easily suited to a remote control of the temperature, for example, as a function of the temperature of the thermoplastics film taken at predetermined spots. Consequently, the new heating station may be placed immediately upstream of the forming station and enables the "buffer" distances, necessary in the known machines in order to take into account the parts of film which have become unusable after the machine has stopped, to be eliminated. This results in addition in the character or the heating conditions of the thermoplastics film easily being adapted, due to the invention, to the rhythm of manufacture of the filled, sealed and cut out containers.

Due to the fact that in the forming station, the space between the preforming piston and the wall of the bore of the locking plate is of very small and constant volume, the quantity of compressed air necessary for completing and terminating the forming of the container is extremely small. In addition to the advantage of a low loss of compressed air, the rise in pressure of the compressed air admitted into the space in question is effected very rapidly, so that the rate of forming containers is considerably increased.

The fact that the welding of the covering sheet on the containers filled with a product to be packed is effected simultaneously with the cutting out, at least partial, of the sealed or closed containers, enables the covering sheet to be perfectly centered with respect to the containers. In addition, as the containers are cut from the thermoplastics film comprising the containers, as soon as said latter are sealed, and as the seal is effected inside the cut-out zone of each container, the parts of the covering sheet which do not serve for the seal and those which are not yet welded, always remain free with respect to the containers, so that the covering sheet is never drawn out. Thus, if there were an error in centering of the covering sheet with respect to the containers, this error could easily be corrected by adjusting the position of said sheet, but this error could not accumulate with other errors from one advance step to the other of the thermoplastics film and the covering sheet. Moreover, as the covering sheet is welded to the containers only inside the cut-out zone, the covering sheet and the thermoplastics film perforated after the containers have been cut out may easily be separated from one another and the perforated thermoplastics film may be completely recovered for manufacturing a new thermoplastics film.

The step by step advance of the thermoplastics film through the whole of the machine at a sinusoidal speed increases the accuracy of the length of passage per step of the film, as the momentary advance and stop of the thermoplastics film and of the containers which are already filled are carried out at low speeds at the beginning and at the end of the travel. This accuracy of the advance step of the thermoplastics film on the one hand and of the centering of the covering sheet with respect to the containers, on the other hand, enables the containers to be cut out with contiguous edges. This also considerably reduces the losses of raw material, i.e. of thermoplastics film. In addition, the advance of the thermoplastics film at a sinusoidal speed enables the average step by step advance speed to be considerably increased without the material contained in the containers passing above the edge and making it impossible to effect a good seal of said containers.

The characteristics mentioned hereinabove relating to the different stations of the machine are necessary for achieving the advantages listed above. The elimination of one of these features would lead to poorer results and would impede the perfect operation of the machine according to the invention.

The invention will be described in greater detail with reference to the accompanying drawings, in which:

FIG. 1 is a side view with part of the machine torn away;

FIG. 4 is a part vertical section of the machine perpendicular to the direction of displacement of the thermoplastics film, along the line IV—IV of FIG. 5;

FIG. 5 is a vertical section through the welding and cutting out station along line V—V of FIG. 4;

FIG. 6 is a plan view in horizontal section, along line VI—VI of FIG. 4, of the upper part of the welding and cutting out tools;

FIG. 7 is a plan view of the lower part of the welding and cutting out tools, from the plane VII—VII of FIG. 4;

FIG. 8 is a diagram showing how the containers are cut out in a substantially square shape; and FIG. 9 is a diagram showing how the containers are cut out in a substantially circular shape.

Figure 1A:
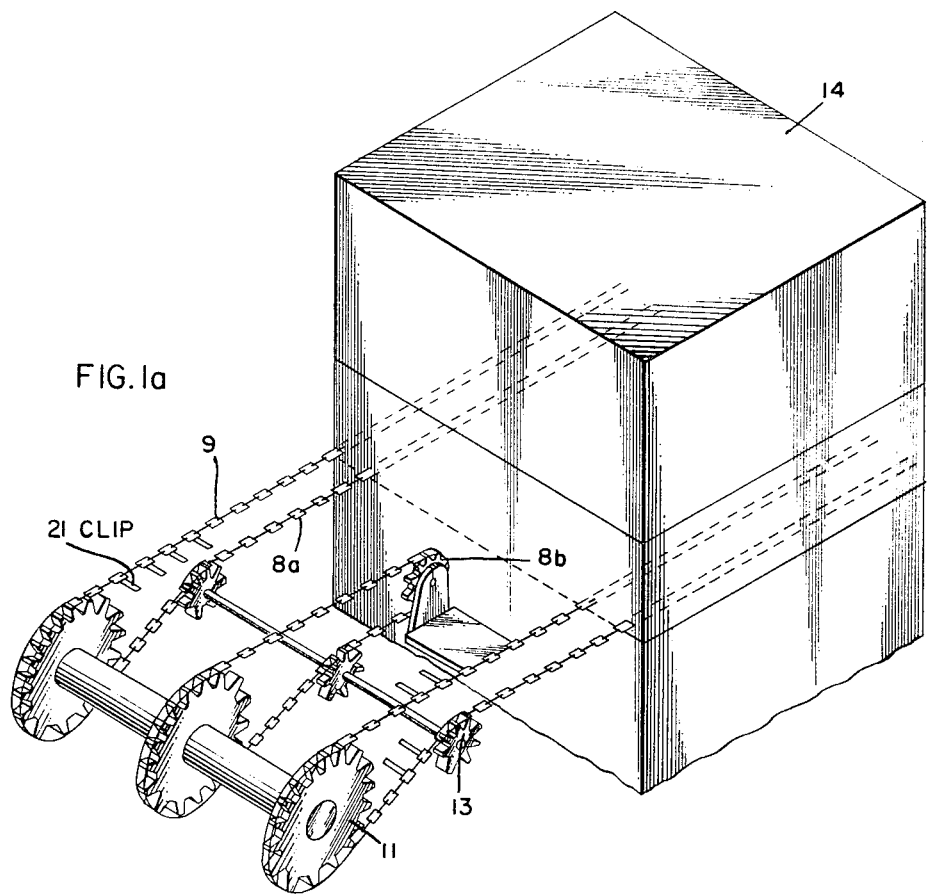
FIG. 1a is a perspective view of a support chain and a part of the conveying and guiding mechanism.

At the upstream end of the conditioning machine (FIG. 1) and on the frame thereof is arranged a support roller 1 from which the thermoplastics film 2 unwinds and the support shaft 3 of which may move in vertical slots 4 made in the sides 5 of the frame of the machine, said roller 1 constantly resting on a support cylinder 6 which is mounted on the frame so as to rotate freely, but fixed in translation.

The thermoplastics film 2, guided in the machine between guide rollers 7 and 7a, reaches a heating station comprising a heating plate 8 arranged above the path of the thermoplastics film 2.

Upstream of the heating station is provided an end of a mechanism for guiding and conveying the thermoplastics film 2, this mechanism being constituted by clips mounted on endless chains 9 traversing the whole of the machine and passing through a drive cylinder 10 connected to a step by step advance motor, through a return cylinder 11 and stretcher rollers 12, 13 (FIG. 1).

Downstream of the heating station, the heated thermoplastics film 2 passes into a forming station 14, shown schematically in FIG. 1, and in which are made the hollow containers 15 intended for receiving the material to be packed. A more detailed description of the forming station 14 is contained in my copending application Ser. No. 2794 filed Jan. 14, 1970 entitled "Apparatus for Forming Hollow Articles Made of Thermoplastics Material" and the disclosure contained therein is incorporated herein by reference.

Then, the thermoplastics film 2 provided with containers 15 passes beneath a filling station 16 known per se. The containers 15 filled in this station 16, then reach a welding-cutting out station 17 mounted on the frame downstream of the filling station 16. On the upper part of the welding-cutting out station 17, there is fixed a support roller 18 for a covering sheet 19 passing around a plurality of return rollers 20, 20a, 20b, 20c and 20d before arriving in horizontal position over the open face of the containers 15 filled with material to be packed. The welding of the covering sheet 19 on the upper edge of the containers 15 takes place simultaneously with the cutting-out, at least partial, of the containers 15.

Figure 2A:
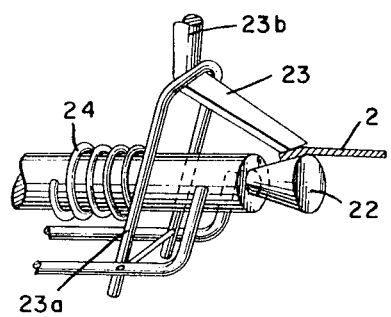
FIG. 2a is a perspective view of a prehension member.
Figure 2:
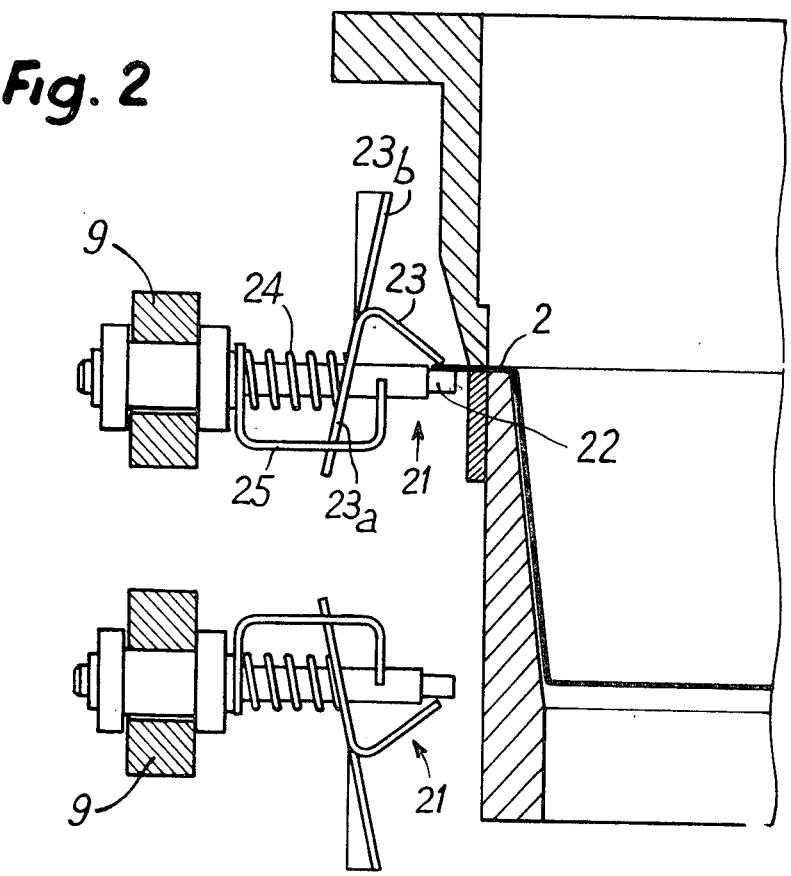
FIG. 2 is a partial section through the machine perpendicular to the direction of displacement of the thermoplastics film, at the station for forming the containers.
Figure 3:
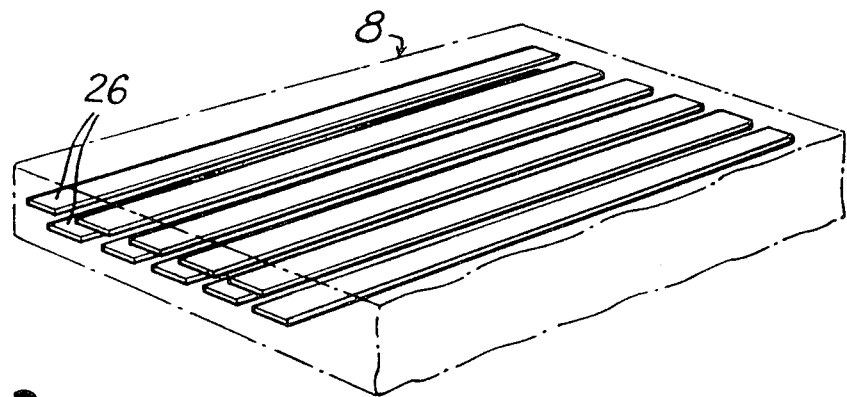
FIG. 3 is a perspective view of the heating plate according to the invention.

Upstream of the heating station 8, the thermoplastics film 2 is gripped on its edges and guided towards the different stations by the guiding and conveying mechanism, a detail of which has been shown in FIG. 2. The conveying and guiding mechanism comprises a large number of prehension members or clips 21 mounted on the endless chains 9.

In accordance with the invention, each prehension member or clip 21 is constituted on the one hand by a stop 22 having a substantially horizontal contact face, fixed to the conveyor chain 9 and preferably having a cylindrical shape and a part of the lateral contact face at least located at the level of the lower face of the thermoplastics film 2, and, on the other hand, by a stop 23 which is movable with respect to the fixed stop 22 mounted on this latter and urged by a spring 24 against the end of the fixed stop 22 so as to apply the edge of the film 2 firmly against the fixed stop 22. The movable stop 23 has the form of a hook, the rear part 23a of which, in the form of a fork, is guided in a stirrup 25 unitary with the fixed stop 22 and is extended beyond the curve of the hook by a finger 23b.

It is advantageous if the contact face of the fixed stop 22, said face being intended for supporting the edge of the thermoplastics film 2, is given a conical shape inclined in the direction of the conveyor chain 9 with which said stop 22 is unitary.

In addition, the cams (not shown) intended for acting on the finger 23b in opposition to the spring 24 so as to cause the opening of the prehension members 21 are located upstream of the heating station 8 and downstream of the welding-cutting out station 17 so that the edges of the thermoplastics film 2 are held by these prehension members 21 along the whole length of the path of the thermoplastics film 2 through the machine.

According to the invention, at least one endless support chain 8a placed beneath the thermoplastics film 2, preferably beneath the central zone of this latter where the heating plate 8 is located and upstream of the forming station. The support chain or chains 8a pass around a return roller 8b provided just upstream of the entrance of the forming station 14. It is also important that this or these support chains 8a are driven in step by step synchronism with the conveyor and guide chains 9. The heated thermoplastics film therefore undergoes neither downward burging nor stress which could be due to a relative sliding between the support chain or chains and the thermoplastics film 2.

The different chains are driven by a step by step advance motor whose speed is sinusoidal. In other words, each advance comprises a slow start, a movement becoming progressively very rapid and then a progressive deceleration movement until the temporary stop of the thermoplastics film.

The heating plate 8 comprises bare resistors 26 in the form of thin metal strips or laminae mounted to be parallel to one another and with respect to the thermoplastics film 2, the longitudinal axis of each resistor 26 being perpendicular to the direction of displacement of the thermoplastics film 2.

According to a preferred embodiment, the resistors 26 are mounted above the thermoplastics film 2 at two different levels and in quincunx, so that the edges of an upper resistor slightly cover the edge of the adjacent lower resistors. In addition, at its downstream end, i.e., the end adjacent the forming station 14, the heating plate 8 is articulated to a horizontal shaft 27 and cooperates at its upstream end with a lifting jack 27a. A member (not shown) for detecting the temperature of the thermoplastics film 2, may be connected to the electrical supply circuit of these resistors 26. The fact of being able to pivot the heating plate 8 about its axis of articulation 27 with respect to the plane of displacement of the thermoplastics film 2, enables a differential heating of the said thermoplastics film 2 to be effected, i.e. a linear temperature gradient in the portion comprised between the entrance and the exit of the heating station.

Since the resistors 26 of this new heating station are bare, the film 2 cools very rapidly when there is a stoppage of the machine. Moreover, as the resistors 26 and therefore the film 2 are capable of being taken to a desired temperature in a minimum of time, the duration of immobilization of the machine is reduced. Finally, the temperature may be maintained at a constant value so that, when the machine is restarted, the forming of the containers can be started immediately, the thermoplastics film 2 being at the suitable temperature; this also enables the duration of immobilization of the machine to be considerably reduced.

The forming station 14 comprises a pre-forming piston which is movable in vertical direction above a hollow mould which is also movable in vertical direction, the lower end of the pre-forming piston being capable of coming near the base of the mould, while its other end rests on the upper edge of a locking plate arranged beneath a movable support, independent thereof, and capable of moving in the same direction as the movable support in which a bore has been made, which is connected on the one hand to a source of pressurized fluid and on the other hand to a small space made between the pre-forming piston and the internal wall of the mould, the intake of the pressurized fluid into said space being controlled by the contact of the movable support with a control member interposed between the locking plate and the movable support, and the seal between the locking plate and the movable support being ensured by means of a sealing joint. According to the invention, the bore of the locking plate is open at its two ends and serves as housing for the upper part of the pre-forming piston and defines with this latter a small space and is capable of being connected to a source of pressurized fluid through either the pre-forming piston, the locking plate, or the movable support of said piston. Also according to the invention, the preforming piston is constituted by an active part intended to be inserted into the mould and having dimensions slightly smaller than those of the hollow part of the mould and by an upper part whose dimensions are equal to those of the upper end of the active part and the height of which is at least equal to that of the hollow part of the mould and substantially equal to that of the bore provided in the locking plate. The volume of the space between the bore and the pre-forming piston thus remains very small and even diminishes slightly during the downward displacement of the piston as the active part of said piston leaves the bore of the locking plate. The space is rendered sealed on the outside by an annular joint arranged on the upper face of the locking plate, against which joint abuts the lower face of the movable support, at the end of the working stroke of the piston. The containers 15 are formed by means of the pre-forming piston which produces a blank in the thermoplastics film 2 when the locking plate applies said film against the edge of the mould and then by means of the compressed air sent into the space between the bore and the upper part of the piston and applying the blank against the internal wall of the mould.

When the hollow containers 15 are formed, they are taken to the filling station 16 shown schematically in FIG. 1. After being filled, they reach the welding-cutting out station 17 which simultaneously welds and partly cuts out the containers 15 and which very accurately ensures the welding of the covering sheet 19 on the open face of each container 15.

In fact, for cutting out the filled and closed containers, it is necessary to have a power which is about double that necessary for the welding. Now the pressure necessary for welding the covering sheet 19 on the edge of the containers 15 varies with the temperature to which said covering sheet must be taken. Thus, the possibility of using, for welding the covering sheet 19, the power necessary for cutting out and therefore available at the welding-cutting out station 17, thus enables the auxiliary heating provided for the covering sheet 19 to be reduced.

The welding-cutting out station 17, shown in FIGS. 1, 4 and 5, comprises two rows of tools 28a and 28b located in two planes perpendicular to the path of the thermoplastics film 2 provided with containers 15, the tools being mounted above and below said path and being capable of moving perpendicularly to the direction of displacement of the thermoplastics film 2. These tools are, in addition, disposed in quincunx, so that the side edges of a cutting out tool of one row of tools are in line with the side edges of the adjacent cutting out tools of the second row of tools.

As is shown in greater detail in FIGS. 4 and 5, the welding and cutting out station 17 comprises two rows of welding and cutting out tools 28a and 28b located one behind the other in two planes perpendicular to the direction of movement of the thermoplastics film 2 provided with containers 15. Each welding and cutting out tool, which has generally been shown as 29 or 30, of a row 28a or 28b is shifted transversely to the direction of movement of the film 2 by a tool width with respect to the welding and cutting out tools of the other row 28b or 28a. Details concerning this advantageous arrangement will be given later.

Each welding and cutting out tool 29 or 30 comprises a welding tool 29 S or 30 S and a cutting out tool 29 D or 30 D. Each welding tool 29 S or 30 S and cutting out tool 29 D or 30 D generally comprises an upper part 29 S$s$ or 30 S$s$ and 29 D$s$ or 30 D$s$ respectively, and a lower part 29 S$i$ or 30 S$i$ and 29 D$i$ or 30 D$i$ respectively (see in particular FIGS. 6 and 7), the lower part being disposed below the path of the thermoplastics film 2.

The welding and cutting out tools will be described hereinafter with reference to containers 15 whose top is square, the corners of said square being slightly skewed. The welding tool 30 S is constituted by an upper part 29 S$s$ or 30 S$s$ in the form of a block or disc of square section mounted with a certain lateral clearance on a rod 31 unitary with a support 32 movable in a direction perpendicular to the path of the thermoplastics film 2, and housed with a certain lateral clearance in a vertical recess 33 of a member 34 which is also unitary with the movable support 32. This welding block or disc 29 S$s$ or 30 S$s$ is provided with a heating circuit 35 and is urged downwardly by a spring 36 against a stop 37 unitary with the lower end of the rod 31.

The welding unit 29 S$s$ or 30 S$s$ comprises a marginal rib 38, for example polygonal in shape, the lower face of which situated in a horizontal plane is intended to apply the covering sheet 19 against the upper edge of the container 15.

The welding tool 29 S or 30 S also comprises a lower part 29 S$i$ or 39 S$i$ constituted by a hollow body or counterpunch unitary at its lower end with a vertically movable unit or frame 39, the travel of this frame 39 being at least equal to the height of the container 15. The upper end of this counterpunch 29 S$i$ or 30 S$i$ has a flat face 40 with the same shape as that of the lower face of the marginal rib 38, but preferably projecting towards the outside with respect to the periphery of the rib 38.

The upper part 29 S$s$ or 30 S$s$ of the welding tool 29 S or 30 S is in vertical alignment with the corresponding lower part 29 S$i$ or 39 S$i$.

The cutting out tool 29 D or 30 D is also constituted by an upper part 29 D$s$ or 30D$s$ and by a lower part 29 D$i$ or 30 D$i$. The upper part 29 D$s$ or 30 D$s$ of the cutting tool is advantageously constituted by the member 34 and more precisely by the lower edge 41 of the internal wall of the vertical recess 33, while the lower part 29 D$i$ or 39 D$i$ of the cutting out tool is produced by the upper edge 42 of the outer wall of the counterpunch 29 S$i$ or 30 S$i$ of the welding tool 29 S or 30 S. The dimensions of the counterpunch 29 S$i$ or 30 S$i$ are such that it may penetrate substantially without lateral clearance into the hollow 33, the two edges 41 and 42 then constituting the cutting edges of the cutting out tool 29 D or 30 D. The small cutting travel is controlled by a jack 43 connecting the movable frame 39 to the movable support 32 and is shown by a relative approaching of these two latter towards one another. The jacks 43 disposed on each lateral side of the welding-cutting out station 17 are fixed at their ends to guide members 39a and 32a respectively unitary with the movable frame 39 and the movable support 32 and being mounted to slide on guide columns 60.

According to a particular feature of the invention, the lower edge 41a of the front wall of the hollow 33 is recessed by an amount at least equal to the cutting out travel with respect to the side edges 41b, 41c and rear edge 41d, so that it cannot cooperate with the front edge 42a of the counterpunch 29 D$i$ or 30 D$i$ in order to cut the containers 15 from the film 2 at that spot (FIG. 5).

In order to ensure a high accuracy, it is proposed to provide a cooling circuit 44 in the member 34, in which the recesses 33 are made, this step preventing expansions of the internal wall of this hollow 33 under the effect of the heat radiated by the welding units 29 S$s$ or 30 S$s$.

Below each container 15 located in the same place as a row of tools 28a or 28b, there is arranged a support plate 45, 46, the plates 45, 46 being mounted in pairs on a common support 47 which is located above the movable frame 39 at a distance which is at least equal to that of the cutting out travel, and which is fixed to the frame 5 of the machine. The support plates 45 located between two tools 29 or 30 of the same row of tools 28a or 28b are provided with lateral guide sheets 48 parallel to the direction of displacement F of the film 2 and capable of serving as a support for the upper edge of the containers 15. At the exit of the welding and cutting out station 27 there is provided a conveyor belt 49 for evacuating the sealed and cut out containers.

According to a particular feature of the invention, the cutting edges 41 and 42 of a cutting out tool 29 D or 30 D of a row of tools 28a or 28b are in alignment parallel to the direction of displacement F of the thermoplastics film 2 and in alignment perpendicular to said direction F (see lines 50 and 51 of FIGS. 6 and 7), the cutting out tools 29 D and 30 D being disposed in quincunx.

In order to avoid a second cutting out of the edges of the containers 15 parallel to the direction of displacement F of the film 2, which edges have already been cut out by the first row of tools 28a, it is advantageous, if the lateral walls 41'b and 41'c of the upper part 30 D$s$ of the cutting out tools 30 D of the second row of tools 28b are bent slightly outward, as indicated in FIG. 6.

The welding and cutting out station 17 operates as follows:

As may be seen in detail in FIGS. 4 to 8, two rows of containers 15 are located in the welding and cutting out station 17, except at the beginning of the welding and cutting out operation where a single row of containers 15 is engaged in the station 17. When, at the beginning of the welding and cutting out operation, the upper parts 29 S$s$ and 29 D$s$ and lower parts 29 S$i$ and 29 D$i$ of the tools 29 of the first row of tools 28a approach one another, the covering sheet 19 is welded in sealed manner on the upper edge of every second container 15 of the first row of containers engaged in the station 17, the welding units 29 S$s$ apply the sheet 19 against the upper edges of the containers 15 held by the counterpunches 29 S$i$, then, the approach movement of the tools continuing, the counterpunches 29 penetrating in the corresponding recesses 33 and the edges 41 and 42 cut the edges of every second container 15 of the first row of containers, the tools of the second row of tools 28b working empty during this first cycle.

Of course, the springs 36 are dimensioned so that they permit a slight upward withdrawal of the welding units 29 S$i$ with the counterpunches 29 S$i$ penetrate into the corresponding recesses 33.

In the case of the example described hereinabove, i.e. when the tools are adapted to the shape of the containers having, seen in plan view, an upper edge whose periphery take the shape of a square, every second container 15 of the first row 28a is completely sealed on the corresponding container, as is shown schematically in FIG. 8 by reference 52. Immediately after the beginning of welding of the covering sheet 19 onto the container 15 in question, the side edges 15b and 15c parallel to the direction of displacement F of the thermoplastics film 2 as well as the front edge 15d and the four chamfered corners 55a, 55b, 55c and 55d are cut out, while the rear edge 15a, taken in the direction of arrow F, still remains attached to the thermoplastics film 2. Since the side edges of the containers 15 of a row, for example 28a, are contiguous, the side edges of the intermediate containers of the first row 28a are also cut out during this operation, the rear and front edges 15'a and 15'd of said intermediate containers still remaining for the moment attached to the thermoplastics film 2 and have not yet been sealed with the covering sheet 19 (see FIG. 8).

With this first row of containers 15 sealed and partially cut out, the counterpunch assembly 29 Di, 30 Di is lowered, particularly those (29 Di) of the first row of tools 28a at least to below the level of the support plates 45 and 46, and the thermoplastics film 2 is advanced by one step, i.e. by a distance equal to that between the rear and front edges 15a and 15d of a container 15, so that the row of containers which were located between the first row of tools 28a is now placed at the location of the second row of tools 28b. When the tools 29 and 30 once more approach one another, every second container 15 of the containers located between the tools 29 and 30 of the first and the second rows of tools 28a and 28b is sealed in a first step, the containers thus welded by the first row of tools 28a being the second, fourth, sixth, etc. container and the containers welded by the second row of tools 28b being the first, third, fifth, etc. container from the left-hand edge of the thermoplastics film 2. As the right-hand side edge of the first container, said edge being parallel to the direction of the arrow F, the left hand side edge of the $n^{th}$ container and the side edges of the $(2n-1)^{th}$ containers then located at the location of the second row of tools 28b, ($n$ ranging from 2 to $m$ for $n$ columns of containers, said columns taken in the direction parallel to the arrow F) have already been cut previously by the first row of tools 28a, it is no longer necessary to cut them out now. This is why the cutting out tools 30 may be rendered inoperative at the location of these side edges by the means recommended previously. On the other hand, the tools of the second row of tools 28b cut out the left hand side edge 15'b of the first, the right hand side edge of the extreme right-hand container and the four corners 55'a, 55'b, 55'c and 55'd and the front edge 15'd of every $(2n-1)^{th}$ container, $n$ ranging from 1 to $m$.

During this same operation, the containers 15 of the columns $2n$ ($n$ ranging from 1 to $m$) and at present being located at the location of the tools 29 of the first row of tools 28a, are completely sealed on the periphery 52 and cut out along the edges 15b, 15c and 15d and along the four corners 55a, 55b, 55c and 15d. Consequently, the containers 15 of the columns $2n$ now located at the level of the second row of tools 28b, which containers were before still attached to the thermoplastics sheet by their edge 15a, are now cut out by the cutting edges 41d and 42d of the cutting out tools 29 D of the first row of tools 28a.

After this welding and cutting out cycle of the containers 15, the thermoplastics film 2 is advanced by one step, the containers of columns $2n$ which are at the level of the second row of tools 28b and have been finally cut out, are evacuated by the conveyor belt 49. The containers forming part of the columns $2n-1$ remain for the moment attached to the thermoplastics film 2 by their edge 15'a and are not cut finally until the following operating cycle, the cutting edges 41d and 42d of the tools 30 D cutting out the edge 15'a of the containers which are already located outside of the welding and cutting out station. These finally cut out containers are then also taken by the conveyor belt 49.

Thus, after having passed through the welding and cutting out station, the containers 15 are completely sealed and cut out.

FIG. 2 shows another configuration of the containers seen in plan view. Here, the containers 53 have a circular periphery. During the first cutting out stage, they are still attached by their read edge 53a to the thermoplastics film 2, this edge 53a being cut out only after the advance of the containers 53 by a step equal to their diameter. Of course, at the location of the edge 53a, the cut-out is effected along a straight line by a length of a few millimeters only.

Containers 15 or 53 may of course have peripheral configurations different from those shown in the drawings. However, it is important that the welding and cutting out tools 29 and 30 are arranged in two rows perpendicular to the direction of displacement of the thermoplastics film 2 and that only one welding and cutting-out tool 29 or 30 operates opposite a column of containers parallel to the direction of displacement of said film, this arrangement enabling the waste of material to be kept to a minimum.

What is claimed is:

1. A machine for conditioning packings of foodstuffs and/or pharmaceutical products, comprising on the same fixed frame and mounted in series, a roller for supporting a thermoplastics film, a mechanism for guiding and conveying the edges of the thermoplastics film, said mechanism comprising a series of clips mounted on endless chains extending along the whole of the machine, a station for heating the thermoplastics film including at least one heating plate, a station for forming containers from the thermoplastics film, a filling station for loading the containers with the material to be packed, welding tools for sealing a covering sheet over the filled containers and cutting out tools for separating the filled and closed containers from the thermoplastic film, wherein each clip of the mechanism for guiding and conveying the thermoplastics film is constituted by a stop fixed with respect to its conveyor chain, the upper face of which stop is located substantially in the same plane as the lower face of the thermoplastics film and by a stop movable with respect to the fixed stop and urged by a spring against the fixed stop and wherein at least one endless support chain is placed below the path of the thermoplastics film in a zone thereof located upstream of the station for forming the containers, the endless chains of the guide and conveyor mechanism and the support chain being connected to a step by step synchronism drive mechanism, the advance speed of which is sinusoidal; the heating plate of the heating station comprises resistors in the form of metal strips parallel to the thermoplastics film and perpendicular to the direction of displacement of this latter, and is articulated at its downstream end to a horizontal shaft and cooperates with a lifting member, said heating plate having rapid thermal response; the forming station comprises a vertically movable unit supporting a hollow mould and a vertically movable support arranged above the movable unit and provided with a pre-forming piston passing through a central bore open at its ends and made in a vertically movable locking plate of such dimensions that it defines with the wall of this bore, whatever the position of said piston between its end positions, a small space that may be obturated by the movable support and connected to a source of pressurized fluid at the end of the preforming stroke of the piston by means of a contact controlled by the movable support; a support roller for the covering sheet is arranged downstream of the filling station; and the welding tools and the cutting out tools are combined in one station only and may effect simultaneously the welding of the covering sheet on the containers filled with the material to be packed and the cutting out, at least partial, of the closed containers, said tools being arranged so that the welding of the covering sheet is carried out inside the zone where the containers are cut out.

2. A machine as claimed in claim 1, wherein the heating resistors in the form of metal strips or lamellae of the heating plate are bare and arranged alternately at two different levels and in quincunx so that their side edges overlap.

3. A machine as claimed in claim 1, wherein the welding and cutting out tools are arranged in quincunx, so as to form two rows of tools located in two planes perpendicular to the direction of displacement of the containers and to present a welding tool and cutting out tool opposite a container of each of the columns of containers parallel to the direction of displacement of the containers.

4. A machine as claimed in claim 1, wherein the welding tools are arranged so as to seal each of the containers in a single operation, while the cutting out tools are arranged so as to cut a part of the edge of the containers during a first cutting out operation and the rest of the edge of the containers after the advance by one step of the containers during a second cutting out operation.

5. A machine as claimed in claim 1, wherein the welding tool is arranged inside the cutting out tool.

6. A machine as claimed in claim 1, wherein the welding tool comprises on the one hand a welding unit arranged above the path of the containers, mounted to move vertically and downwardly urged by a spring, and on the other hand a hollow counterpunch which is vertically movable and arranged below the path of the containers and in alignment with the welding unit so that the lower marginal rib of this latter is located opposite the upper face of the counterpunch.

7. A machine as claimed in claim 6 including a recess for housing at least a portion of the welding tool with a lateral clearance, said recess having a vertical wall; a counterpunch having an outer wall, the cutting out tool being constituted by the lower edge of said vertical wall and the upper edge of said outer wall, the counterpunch being capable of penetrating without lateral clearance into said recess.

8. A machine as claimed in claim 1 wherein the cutting out tools are arranged in rows and have lateral edges parallel to the direction of displacement of the containers, at least one part of the lateral edges of the first row of tools being in alignment with at least one part of the lateral edges of the cutting out tools adjacent the second row of tools and wherein at least one part of the edges of the cutting out tools of the two rows of tools is located in the same plane perpendicular to the direction of displacement of the containers and situated between the two rows of tools.

9. A machine as claimed in claim 1 wherein the welding tool comprises a heating circuit and a recess is provided for housing said heating circuit, said recess having a wall provided with a cooling circuit.

10. A machine as claimed in claim 1, wherein the stop comprises a contact face of conical shape inclined in the direction of the conveyor chain, with which the stop is unitary, the contact face being intended to support the edge of the thermoplastics film.

* * * * *